(12) United States Patent
Anand et al.

(10) Patent No.: US 9,317,829 B2
(45) Date of Patent: Apr. 19, 2016

(54) DIAGNOSING INCIDENTS FOR INFORMATION TECHNOLOGY SERVICE MANAGEMENT

(71) Applicant: International Business Machines Corporation, Armonk, NY (US)

(72) Inventors: Rangachari Anand, Teaneck, NJ (US); Juhnyoung Lee, Yorktown Heights, NY (US); Rong Liu, Sterling, VA (US); Kohtaroh Miyamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 13/672,365

(22) Filed: Nov. 8, 2012

(65) Prior Publication Data

US 2014/0129536 A1 May 8, 2014

(51) Int. Cl.
G06Q 10/06 (2012.01)
G06F 11/07 (2006.01)
G06F 17/30 (2006.01)

(52) U.S. Cl.
CPC .......... *G06Q 10/0635* (2013.01); *G06F 11/079* (2013.01); *G06F 17/30705* (2013.01)

(58) Field of Classification Search
CPC ............ G06Q 10/0635; H04L 12/2414; G06F 11/079; G06F 17/30705; G06F 17/3061; G06F 17/30; G06N 5/048; G06N 5/04; G06N 5/047; G06N 3/02; G06N 3/04; G06N 3/08
USPC ...................... 707/706–752, 705; 714/1–799; 702/127, 182, 183, 185; 706/17, 18, 706/20, 21; 719/318
See application file for complete search history.

(56) References Cited

U.S. PATENT DOCUMENTS

| 6,601,188 | B1   | 7/2003 | Wilding |
| 7,389,282 | B2 * | 6/2008 | Maren ............................ 706/52 |
| 7,552,447 | B2 * | 6/2009 | Uthe .............................. 719/318 |
| 7,644,057 | B2 * | 1/2010 | Nelken et al. ................... 706/55 |
| 7,672,811 | B2 * | 3/2010 | Xiao et al. ..................... 702/185 |

(Continued)

FOREIGN PATENT DOCUMENTS

| CA | 2287870    | 5/2001 |
| CN | 101206734  | 6/2008 |
| JP | 2007034674 | 2/2007 |

OTHER PUBLICATIONS

P. Filzmoser, A Multivariate Outlier Detection Method, 2004, Proceedings of the Seventh International Conference on Computer Data Analysis and Modeling, vol. 1, pp. 18-22, Belarusian State University, Minsk.*

Renato Cordeiro de Amorim, Boris Mirkin, Minkowski Metric, Feature Weighting and Anomalous Cluster Initializing in K-Means Clustering, 2012, Elsevier, Pattern Recognition, vol. 45, Issue 3, pp. 1061-1075.*

(Continued)

*Primary Examiner* — Jacob F Bétit
*Assistant Examiner* — Diedra McQuitery
(74) *Attorney, Agent, or Firm* — Scully, Scott, Murphy & Presser, P.C.; Louis J. Percello, Esq.

(57) ABSTRACT

Diagnosing and detecting causes of an incident may comprise classifying the incident by keywords, searching for co-occurring and reoccurring group of incidents, summarizing commonalities in the group of incidents, correlating the group of incidents with causes, defining association rules between the commonalities, and predicting potential problems based on the correlated group of incidents with causes.

27 Claims, 12 Drawing Sheets

(56) References Cited

U.S. PATENT DOCUMENTS

| | | | |
|---|---|---|---|
| 7,822,747 B2* | 10/2010 | Clark et al. | 707/736 |
| 8,032,792 B2* | 10/2011 | Zakonov et al. | 714/38.1 |
| 8,301,613 B2* | 10/2012 | Grabarnik et al. | 707/706 |
| 2004/0078667 A1 | 4/2004 | Salem | |
| 2006/0070043 A1 | 3/2006 | Viega et al. | |
| 2006/0168170 A1* | 7/2006 | Korzeniowski | 709/223 |
| 2007/0192078 A1* | 8/2007 | Nasle et al. | 703/14 |
| 2008/0091454 A1* | 4/2008 | Fisher, Jr. | 705/1 |
| 2008/0126881 A1 | 5/2008 | Bruckhaus | |
| 2008/0228504 A1* | 9/2008 | Nguyen et al. | 705/1 |
| 2009/0063387 A1* | 3/2009 | Beaty et al. | 706/50 |
| 2009/0259954 A1* | 10/2009 | Chenthamarakshan et al. | 715/764 |
| 2009/0313219 A1* | 12/2009 | Gupta et al. | 707/3 |
| 2010/0082620 A1* | 4/2010 | Jennings et al. | 707/736 |
| 2010/0131315 A1* | 5/2010 | Gilbert et al. | 705/7 |
| 2010/0174949 A1* | 7/2010 | Athey et al. | 714/39 |
| 2010/0274596 A1* | 10/2010 | Grace et al. | 705/7 |
| 2010/0318846 A1* | 12/2010 | Sailer et al. | 714/26 |
| 2011/0208681 A1* | 8/2011 | Kuecuekyan | 706/21 |
| 2011/0295898 A1* | 12/2011 | Grabarnik et al. | 707/780 |
| 2012/0066547 A1* | 3/2012 | Gilbert et al. | 714/26 |

OTHER PUBLICATIONS

G. Salton, A. Wong and C.S. Yang, A Vector Space Model for Automatic Indexing, Nov. 1975, Communications of the ACM, vol. 18, No. 11, pp. 613-620.*

Kang, Y. B., Zaslaysky, A., Krishnaswamy, S., & Bartolini, C. (Jun. 2009). A computer-facilitated method for matching incident cases using semantic similarity measurement. In Integrated Network Management-Workshops, 2009. IM'09. IFIP/IEEE International Symposium on (pp. 10-19). IEEE.*

Medem, A., Akodjenou, M. I., & Teixeira, R. (Jun. 2009). Troubleminer: Mining network trouble tickets. In Integrated Network Management-Workshops, 2009. IM'09. IFIP/IEEE International Symposium on (pp. 113-119). IEEE.*

Strategy for Implementing an End-to-End Incident Management Process, an IP.com Prior Art Database Technical Disclosure, Authors et. al.: Disclosed Anonymously, IPCOM000166926D, Jan. 28, 2008.*

Cordeiro de Amorim, Renato, and Boris Mirkin. "Minkowski metric, feature weighting and anomalous cluster initializing in K-Means clustering." Pattern Recognition 45.3 (2012): 1061-1075.*

N. Brownlee et al; "Expectations for Computer Security Incident Response (RFC2350)"; Jun. 1, 1998; IP.com No. IPCOM000002920D.

* cited by examiner

| CONSEQUENT | ANTECEDENT | CONFIDENCE % | |
|---|---|---|---|
| SomeApp | SomeApp2 | 100.0 | — 202 |
| SomeApp | SomeApp2<br>ServerXYZ | 100.0 | |
| SomeApp | MQSERIES<br>ServerXYZ2 | 100.0 | |
| SomeApp | MQSERIES<br>ServerXYZ<br>ServerXYZ2 | 100.0 | |
| SomeApp | SomeApp2<br>DB2 | 100.0 | |
| SomeApp | SomeApp2<br>ServerXYZ2 | 100.0 | |
| SomeApp | CLUSTER<br>MQSERIES | 100.0 | |
| SomeApp | SomeApp2<br>DB2<br>ServerXYZ | 100.0 | |
| SomeApp | SomeApp2<br>SomeApp3 | 100.0 | |
| SomeApp | SomeApp4<br>MQSERIES | 100.0 | |
| SomeApp | SomeApp5<br>MQSERIES | 75.0 | — 204 |
| SomeApp | SomeApp5 | | |

FIG. 2

TICKET

- Problem_ID: *IN2*
- Severity: *1*
- Original_Severity: *2*
- Problem_Abstract: *APPLICATION: SomeApp/ISSUE: someApp NOT CONNECTING TO MQSeries*
- DESCRIPTION: *REPORTER: JOE DOE, TICKET#:, APPLICATION: SomeApp, SERVER/URL:, ISSUE: SomeApp NOT CONNECTING TO MQ Series, DUTY MANAGER NEEDED: NO, IF SO, IMPACT: SERVICE ORDERS ARE BEING DELAYED IN COMPLETING, TEAM TO BE ENGAGED: TEAM1*
- Problem_Result: *RECYCLED THE SomeApp JVM ON ServerXYZ*
- Occurred_Date: *NOV. 28, 2011*
- Occurred_Time: *3:50:27*
- Open_Date: *NOV. 28, 2011*
- Open_Time: *3:50:27*
- Close_Date: *DEC. 3, 2011*
- Close_Time: *5:02:25*
- Solved_Date: *NOV. 28, 2011*
- Solved_Time: *4:23:39*
- Current_Target_Date: *NOV. 29, 2011*
- Current_Target_Time: *3:50:27*
- Account_ID: *ACCOUNT1*
- Reporter_ID: *JOE DOE*
- Reporter_Group: *GROUP1*
- Resolver_ID: *MARY GIOIA*
- Resolver_Group: *GROUP2*
- Problem_Code : *CLOSED*

FIG. 9A

TICKET CLASSIFICATION
- UID: 1
- Problem_ID: IN2
- Category_ID: 1
- STATUS: TEXT MINED
- IsCause:
- ConfidenceScore: 100

- UID: 2
- Problem_ID: IN2
- Category_ID: 4
- STATUS: TEXT MINED
- IsCause:
- ConfidenceScore: 100

- UID: 3
- Problem_ID: IN2
- Category_ID: 3
- STATUS: CONFIRMED
- IsCause: Y
- ConfidenceScore:
- ...

FIG. 9B

CATEGORY RELATIONSHIP
- UID: 1
- Relationship_ID: REL1
- Relationship_Type: APPLICATION DEPENDENCY
- Category_ID: 1
- ROLE:

- UID: 2
- Relationship_ID: REL1
- Relationship_Type: APPLICATION DEPENDENCY
- Category_ID: 2
- ROLE: REQUIRED APPLICATION

- UID: 3
- Relationship_ID: REL2
- Relationship_Type: APPLICATION ARCHITECTURE
- Category_ID: 1
- ROLE:

- UID: 4
- Relationship_ID: REL2
- Relationship_Type: APPLICATION ARCHITECTURE
- Category_ID: 3
- ROLE:
- ...

FIG. 9C

TICKET CATEGORIES

- Category_ID: *1*
- Category_Type: *APPLICATION*
- Category_Name: *SomeApp*
- Category_Full_Name: *SOME APPLICATION ON HOSTING*
- Account_ID: *ACCOUNT1*
- USAGE:

- Category_ID: *2*
- Category_Type: *APPLICATION*
- Category_Name: *SomeApp2*
- Category_Full_Name: *SOME APPLICATION ON USER IDENTITY*
- Account_ID: *ACCOUNT1*
- USAGE:

- Category_ID: *3*
- Category_Type: *SERVER*
- Category_Name: *ServerXYZ*
- Category_Full_Name: *ServerXYZ.aaa.corp.com*
- Account_ID: *ACCOUNT1*
- USAGE: *PRODUCTION*

- Category_ID: *4*
- Category_Type: *MIDDLEWARE*
- Category_Name: *MQ*
- Category_Full_Name: *MQSeries*
- Account_ID:
- USAGE:
- ...

FIG. 9D

DIAGNOSING INCIDENTS FOR INFORMATION TECHNOLOGY SERVICE MANAGEMENT

FIELD

The present application relates generally to computers, and computer applications, and more particularly to Information technology service management and incident management.

BACKGROUND

An Information Technology (IT) Incident Management strives to restore normal service operations quickly to minimize business impact, thus ensuring high levels of service quality and availability. An incident is any event which is not part of the standard operation of a service and which causes, or may cause, an interruption to or a reduction in the quality of that service. Incidents are the result of failures or errors in IT infrastructure. A reported or logged incident is also referred to as a ticket, an incident ticket or a problem ticket interchangeably in this disclosure. Incident management becomes more important as IT's contribution to business grows. It also faces increasing challenges because an enterprise often maintains many applications in a shared IT environment composed of thousands of interdependent IT components, e.g., network, hardware, software etc. Incident diagnosis often requires investigation on complicated causes aggregated from this environment. For example, identifying the nature and cause of an IT incident by examining the symptoms, is a challenge because modern enterprise IT infrastructure shares multiple layers of IT components (applications, operating systems, middleware, servers, hardware, storage, network, and others) in a complicated manner. An IT incident is rarely an isolated incident.

BRIEF SUMMARY

A method for diagnosing and detecting causes of an incident interactively, in one aspect, may comprise classifying the incident by keywords. The method may further comprise searching for co-occurring and reoccurring group of incidents. The method may also comprise summarizing commonalities in the group of incidents. The method may further comprise correlating the group of incidents with causes. The method may also comprise defining association rules between the commonalities. The method may further comprise predicting potential problems based on the correlated group of incidents with causes.

In another aspect, a method of for diagnosing and detecting causes of an incident interactively, may comprise searching for relevant incident tickets by keywords. The method may further comprise computing similarity scores to generate a rank list of results of the search. The method may also comprise determining context relevancy weight by examining account technology portfolio to eliminate one or more of the incident tickets from the ranked list of results. The method may further comprise returning a top predetermined number of results from the ranked list of results.

A system for diagnosing and detecting causes of an incident interactively, in one aspect, may comprising a user interface operable to execute on a processor and issue a query. The system may also comprise a search engine operable to receive the query, transform the query into sub-queries comprising a structured search and a free-text search, and to search for co-occurring and reoccurring group of incidents. The search engine may be further operable to correlate the group of incidents with causes based on common events found in the group of incidents, and present the co-occurring and reoccurring group of incidents and the causes to the user interface.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 2 shows example rules in association rule mining in one embodiment of the present disclosure.

FIGS. 9A-9D illustrate a sample generalized ticket data model that is populated with example data.

DETAILED DESCRIPTION

Figure 1:
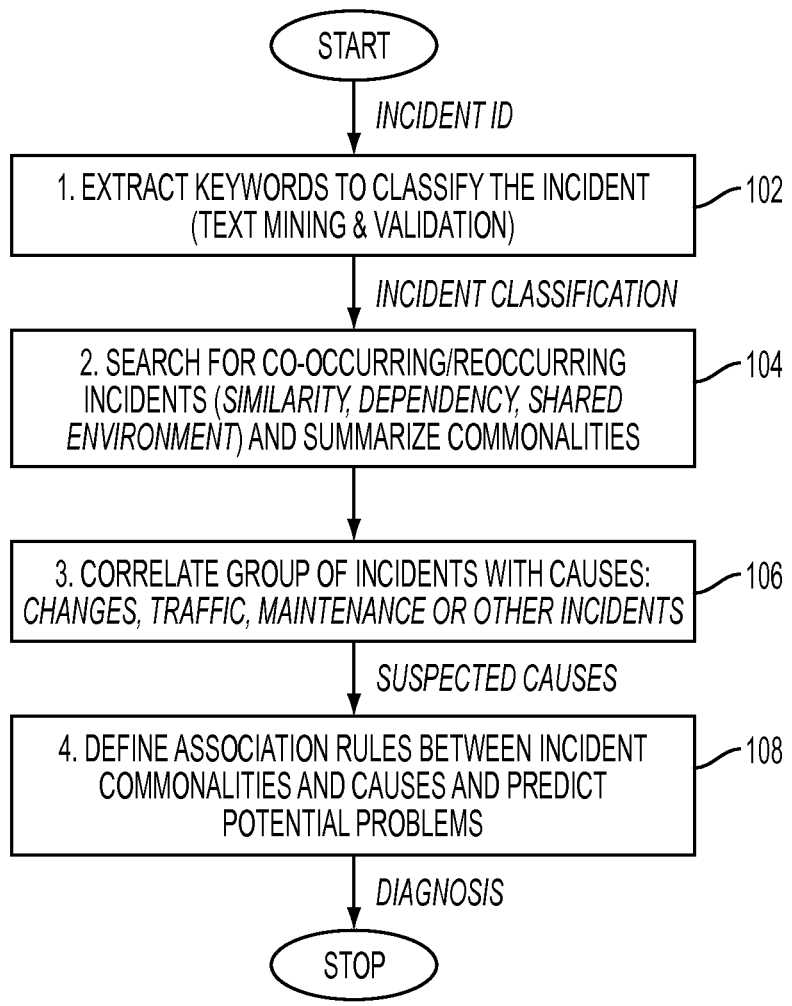
FIG. 1 is a flow diagram illustrating a method of diagnosing an IT Incident in one embodiment of the present disclosure.

An analytical platform is disclosed that aggregate events from multiple sources, detect suspected causes, suggest resolution, and predict potential failures. An approach is presented for discovering useful, relevant co-occurring or reoccurring incidents. An IT incident management approach of the present disclosure in one embodiment may diagnose incidents by effectively searching for relevant co-occurring and reoccurring incidents. Co-occurring incidents happen at different IT components concurrently and are possibly caused by the same root causes. Reoccurring incidents repeat over time with similar symptoms or features. These relevant incidents together can reveal patterns of application incidents, helping subject matter experts (SMEs) to reason about root causes of incidents and accelerate incident resolution. In another aspect, IT incident management approach of the present disclosure is a data-driven approach to discovering relevant incidents, and analyzing and utilizing their information (e.g., symptoms, causes, etc.) that are available and inferable. Relevant co-occurring incidents often suggest root causes of the incident. Also, an IT incident may reoccur over time—reoccurring incidents (providing more data from experience). Reference to similar cases in history helps accelerate resolution process.

Discovering relevant co-occurring or reoccurring incidents is not straightforward. For example, incidents are handled by workgroups that are organized by IT components (e.g., network group, AIX group, etc.) and also by geography, and so the resolution knowledge is scattered across multiple groups and geographies. Limited information sharing between workgroups and different styles in recording incidents (e.g., structured, unstructured, lots of acronyms, system-entered or manually entered) further complicate the discovery. Free text search without considering incident context often has low accuracy. For instance, search for "network" may return too many results; acronyms may contribute to ambiguities, e.g., "HRS" may be referring to "hostname resolution systems" or "hours." Search results usually do not provide sufficient hints for root causes. For example, problems can be caused by incident of dependent components. The approach of the present disclosure that discovers relevant co-occurring and reoccurring incidents may improve resolution efficiency.

In one aspect, IT Service Management (ITSM) concerns customer's perspective of IT's contribution to the business or organization. An Incident Management may be a component of an IT service management (ITSM) process area, and aims to restore a normal service operation as quickly as possible and to minimize the impact on business operations, thus ensuring that the best possible levels of service quality and availability are maintained Incident, e.g., in a cost-effective manner. Information Technology Infrastructure Library (ITIL) refers to a set of practices for ITSM that focuses on aligning IT services with the needs of business. ITIL describes procedures, tasks and checklists that are not organization-specific, used by an organization for establishing a minimum level of competency.

The approach of the present disclosure may be implemented in the forms of a method or process, a system, and an article of manufacture.

FIG. 1 is a flow diagram illustrating a method of diagnosing an IT Incident in one embodiment of the present disclosure. Generally, in one embodiment of the present disclosure, a method of diagnosing an IT Incident may implement the following flow: 1) Search for relevant incidents by keywords; 2) The search may return a large number of incidents; 3) Use similarity score (e.g., Space vector model) to rank the returned results; 4) To further eliminate irrelevant incidents that look similar, e.g., after the similarity score ranking, get a context relevancy weight by looking at account technology portfolio; 5) From the ranked list, return final search results (e.g., top predetermined number, e.g., 10) by determining a similarity threshold or using clustering techniques.

Referring to FIG. 1, at 102, keywords are extracted from an incident ticket to classify the incident. A ticket can be problem ticket or change ticket. An "incident" or "incident ticket" in the present disclosure refers to "problem ticket." Text mining and validation techniques may be utilized to perform this step. For example, categories may be determined to characterize incidents, a category dictionary may be defined, and category relationships may be set up. Examples of categories or classification may include but are not limited to, Applications, Servers, Middleware, Infrastructure (storage, etc.). Keywords are extracted from IT incidents (e.g., tickets or the like) and the IT incidents are categorized using, e.g., text mining techniques (dictionaries, synonyms, annotation patterns, etc.). Examples of keywords may include server name identified by name or Internet Protocol (IP) address, application name, and symptoms. These keywords are called classification keywords. Accuracy of the extracted keywords may be verified using category relationships or incident context. For example, for acronyms, it may be checked whether a full name is present. As another example, it may be checked whether the combination of keywords (servers, applications, middleware, etc.) is valid against the domain knowledge (i.e., application architecture). As yet another example, it may be checked whether domain knowledge is missing, the terms that usually appear together may be dynamically learned and then those co-occurring terms may be used to determine if a term is valid. For example, application and server names appearing together may signal that the application runs on that server.

In one embodiment of the method of the present disclosure, accuracy weight (w1) may be assigned based on accuracy. User may further verify each extracted keyword and update the accuracy weight.

An output of the processing shown at 102 is the classification of the incident ticket.

The following description illustrates the processing at 102 with reference to an example shown in Table 1. Table 1 shows an example of application incidents, e.g., a problem ticket (also referred to as an incident or incident ticket) entered into an incident management system.

TABLE 1

| Attributes | Value |
| --- | --- |
| Incident ID | IN1 |
| Problem Abstract | ServerXYZ Issue: MQ connectivity has been reported lost. |
| Problem Description | Ticket#: Sev1; Application: SomeApp; Server/URL: ServerXYZ Issue: MQ connectivity has been reported lost. ITD (InternetService) team should verify and "run mustGather and recycle SomeApp (on ServerXYZ and ServerXYZ 2 as needed; Duty manager needed or not (not at this time); if so, impact: No revenue impact. Business impact is to some of the SomeApp (software service) orders (but not all); Team to be engaged: InternetService |
| Problem Result | SomeApp recycled |
| Occurred Time | 2011-12-25 08:28:00 |
| Solved Time | 2011-12-25 09:25:40 |
| Account ID | SomeAccount |
| Resolver Group | SomeGroup |

As an example, the example incidents may be classified by keywords from the following facets: application, server, middleware, infrastructure, and symptom. It is often feasible to obtain decent vocabulary for these facets. For instance, companies usually maintain lists of applications, servers and middleware as part of their asset portfolio. Such lists become good dictionaries. One can also gather a list of frequently used terms as a dictionary, for instance, for symptom facet. With these dictionaries, keywords can be extracted from incident text by using text analysis software, for instance, IBM Context Analytics (ICA). Synonyms and annotation patterns are used to improve the accuracy of extraction. For example, MQ is a synonym of MQSeries. After classification, an incident can be represented by a bag of keywords. For instance, incident IN1 in Table 1 is classified by keywords as shown in Table 2. These keywords are referred to as classification keywords.

Table 2 shows a classification of the incident example shown in Table 1.

TABLE 2

Application: SomeApp
Server: serverXYZ, ServerXYZ2
Middleware: mqseries
Symptom: mqseries connectivity After classification, the methodology of the present disclosure in embodiment validates the accuracy of each extracted keyword and assigns an appropriate accuracy weight that can be used for discovering relevant incidents later. In one aspect, this validation is to ensure (1) an acronym is semantically correct, and (2) the combination of extracted keywords for an incident is valid against proper domain knowledge. For example, to check if acronym "HRS" indeed means "Hostname Resolution System", a methodology of the present disclosure may first check if its full name can be found in the incident text. If it cannot be found, the methodology of the present disclosure may rely on other extracted keywords or attributes to infer the meaning as in (2). For the example shown in Table 3, the methodology of the present disclosure has learned that "SomeApp" is hosted in server "ServerXYZ" and requires middleware "MQSeries". With this application architecture information, the methodology of the present disclosure can confirm that the combination of keywords {SomeApp, ServerXYZ, mqseries} is correct. In case domain knowledge is not available, the methodology of the present disclosure can learn it dynamically by checking co-occurrence of keywords (See, Berry, M. W. and Castellanos, M. Survey of Text Mining I: Clustering, Classification, and Retrieval, 2nd Edition, Springer, 2007). For example, if the joint probability of keyword "SomeApp" and "ServerXYZ2" is higher than a certain level, the methodology of the present disclosure can infer that "ServerXYZ2" may be a hosting server of "SomeApp". After validation, the methodology of the present disclosure in one embodiment assigns an accuracy weight w1 to each extracted keyword to indicate the level of confidence on its validity.

In one embodiment of the present disclosure, domain knowledge may be learned as follows.

Relationships between keywords (i.e., domain knowledge) are automatically learned through association rule mining, e.g., using CARMA or APRIORI algorithm, e.g., from historical incident data and/or dynamically entered data. Each of the rules in association rule mining contains antecedents, consequents, and confidence (the proportion of tickets with the specified antecedent keywords for which the consequent keywords are also present). Each of the keywords is validated against the domain knowledge. The confidence score is used as accuracy weight of keywords.

FIG. 2 shows rules in association rule mining. The rule shown at 202 indicates there is a dependency between applications, e.g., SompApp2 and SomeApp with 100% confidence. Therefore, when searching for relevant tickets by "SomeApp", keyword "SomeApp2" is also included. For instance, if an incident ticket includes "SomeApp" keyword, tickets with "SomeApp2" keyword is also searched for. The rule at 204 indicates that if a ticket contains SomeApp5, mqseries, and SomeApp keywords, there is 75% confidence that SomeApp means "Some Application", an application name. Then 75% becomes the accuracy weight of "SomeApp" during keyword validation. The association rules may be learned dynamically and/or periodically and the domain knowledge updated accordingly, periodically and/or dynamically.

Referring to back to FIG. 1, at 104, co-occurring and/or reoccurring incidents, for example, based on similarity, dependency, shared environment, are searched for, and the commonalities are summarized. Similarity may be determined by checking whether the same or substantially the same keywords (e.g., "cannot login" as symptom keywords, same server name, same application name, etc.) are present. An example of identifying dependency may include checking whether an application uses a database (DB) server (e.g., problem specified in an incident ticket may be "cannot login to application A", and application A uses a DB server that is under construction, in which case dependency is identified between application A and the DB server). The processing at 104 identifies co-occurring and/or reoccurring incidents. This process may include determining keywords and other constraints (e.g., time) for search. For example, for reoccurring incidents, keywords may include classification keywords of incident i. For co-occurring incidents, keywords may include classification keywords+classification keywords of dependent component (e.g., dependent app names, shared infrastructure components). Other keywords may be provided by users.

Each determined keyword may be assigned a boosting weight (w2). Relevant (co-occurring and reoccurring) incidents are searched for by keywords and constraints.

To explain in other words, after classification, the methodology of the present disclosure may structure incident information out of the free-form text. A hybrid search engine of the present disclosure may integrate both faceted search and free text search to discover co-occurring and re-occurring incidents. To simplify its use, the search engine may require only an incident ID as an input, and automatically decide appropriate search keywords and ranks returned results by relevancy from high to low.

To find reoccurring incidents, the search engine may use classification keywords as search terms. For example, Table 2 shows all search keywords for finding reoccurring incidents of IN1 (see Table 1). It takes additional consideration to find co-occurring incidents. First, co-occurring incidents happen about the same time. Hence, a mandatory time constraint may be placed to limit the search scope to recent incidents. Second, co-occurring incidents may be reoccurring events. Therefore, classification keywords are also taken. Moreover, co-occurring incidents may indicate dependencies among involved IT components. Hence, the methodology of the present disclosure in one embodiment adds keywords representing dependent components as search terms. These keywords are referred to as dependency keywords. Taking the same example IN1, to find co-occurring incidents, two dependent applications, "DepApp1" and "DepApp2" are added. A boosting weight (w2) can be assigned to each search keyword based on its impact. The search engine may assign a default weight for each dependency keyword, for instance, w2=2.

The following shows the above-described example scenario for searching for co-occurring and/or reoccurring incidents. Table 3 shows search keywords.

TABLE 3

| | Search Keywords | |
|---|---|---|
| Facets | Recurring Incidents | Co-occurring Incidents |
| Application | SomeApp | DepApp1, DepApp2 |
| Server | ServerXYZ, ServerXYZ2 | |

TABLE 3-continued

| | Search Keywords | |
|---|---|---|
| Facets | Recurring Incidents | Co-occurring Incidents |
| Middleware | mqseries | |
| Symptom | mqseries connectivity | |

The search keywords shown in Table 3 are transformed into structured and unstructured queries.

With search keywords defined, incidents that satisfy any of the search keywords and mandatory time constraints are returned to achieve a high recall rate. For instance, to search for co-occurring incidents for IN1, its search keywords and time constraints are represented as a query shown in Table 4. This query has both structured and unstructured portions. The structured query searches for incidents by using the incident classification keywords and structured fields in database tables. The unstructured part handles the need for free text search, for example, incident symptoms. The final search result is the union of those returned from the two queries. Table 4 below shows formulated search keywords as queries in one embodiment of the present disclosure.

Table 4 shows the transformed search keywords.

TABLE 4

Structured:
(application in ("SomeApp", "DepApp1", "DepApp2") or server in ("ServerXYZ", "ServerXYZ2") or middleware in ("mqseries")) and occurred_time between ("12/22/2011", "12/25/2011") )
Unstructured:
+mq +connectivity date>="2011-12-22" date<="2011-12-25"

With a large number of results returned from search, similarity score of each returned result is then calculated in one embodiment of the present disclosure. The methodology of the present disclosure in one embodiment may adapt vector-space model (Salton, G., Wong, A., and Yang, C. S. (1975), "A Vector Space Model for Automatic Indexing," Communications of the ACM, vol. 18, nr. 11, pages 613-620) to calculate the similarity score for returned incidents. Based on this model, a document is represented as a vector of keywords $v=x_1, x_2 \ldots, x_n$) in an n-dimensional vector space, where xi is the weight of keyword i. Here, $xi=w1i \cdot w2i$. If keyword i is not present in the document, $xi=0$. $|v|^2=\Sigma_n x_i^2$ is the length of vector. The similarity between two documents $(v_1, v_2)$ is the cosine of the angle θ between them, i.e., $$s = \cos(\theta) = \frac{v_1 \cdot v_2}{|v_1||v_2|},$$

where $v_1 \cdot v_2 = \Sigma_n x_{1i} x_{2i}$. The vector space in the example contains the classification keywords of incidents. The vector of an incident contains all of its classification keywords, and conditionally the dependency keywords. When a dependency keyword is found in a returned incident, it is added to the vector to boost the similarity score. The weight of a keyword is $x=w_1 w_2$, where $w_1$ is the accuracy weight and $w_2$ is the boosting weight. Note that in a regular vector-space model, keyword frequency is often an important factor for weight. However, here incident text is often dominated by technique specification or message logs. For instance, a server name appears many times in a log. Frequency-based weights may favor incidents with lengthy messages and have negative impact on search precision.

To illustrate, consider two relevant incidents IN2 ($v_2$) and IN3 ($v_3$) for incident IN1 ($v_1$) as shown in Table 5. $v_1$ has five classification keywords ($w_1=1$) and two dependency keywords ($w_2=2$). $v_2$ matches three of the classification keyword (i.e., $v_1 \cdot v_2=3$). The similarity score between $v_1$ and $v_2$ is $$\frac{3}{\sqrt{5} * \sqrt{3}} = 0.77.$$

$v_3$ matches one classification keyword and one dependency keyword. Thus, $v_1 \cdot v_3=1*1+2*2=5$ and the length of $v_1$ is $5+2^2=9$. The similarity score between $v_1$ and $v_3$ is $$\frac{5}{\sqrt{9} * \sqrt{5}} = 0.75.$$

For example, similarity score (s) between v1 and v2 (v3) are calculated. Here, assume boosting weight w2 for dependency keyword is 2. Table 5 shows the calculated similarity scores.

TABLE 5

| | | Keyword Vector | | | | | | | | |
|---|---|---|---|---|---|---|---|---|---|---|
| | | | | | mq | | dependent app | | $v_1 \cdot v_2$ | $|v_1|*|v_2|$ |
| Incident | | SomeApp | ServerXYZ | ServerXYZ2 | mq | conn. | DepApp1 | DepApp2 | (or $v_3$) | (or $|v_3|$) | Similarity |
| $v_1$ | IN1 | 1 | 1 | | 1 | 1 | | 2 | | | |
| $v_2$ | IN2 | 1 | 1 | | | 1 | | | 3 | $\sqrt{5}*\sqrt{3}$ | 0.77 |
| $v_3$ | IN3 | | 1 | | | | | 2 | 5 | $\sqrt{9}*\sqrt{5}$ | 0.75 |

The similarity score considers whether two incidents are similar to each other in terms of classification keywords, but it may not be sufficient for finding truly relevant incidents. Take a query with two keywords {"db2", "SomeApp"} as an example. This query may return a large number of incidents because db2 is a widely used component. Among them, many incidents are about general DB2 issues irrelevant to specific applications. However, since these incidents are classified by only "DB2" keyword, their similarity score $$\frac{1}{\sqrt{2} * 1} = 71\%$$

is actually considered high.

Figures 3A, 3B, 3C:
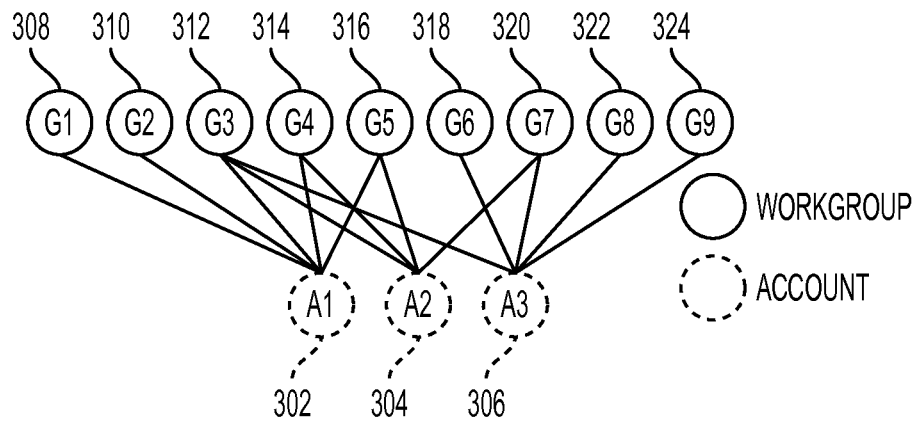
FIG. 3A shows an example diagram with plotted accounts and specialized workgroups, where each node is either a workgroup or an account and the link between an account and a workgroup indicates the workgroup is called for the account's incidents.
FIG. 3B shows computed similarity between example accounts plotted in FIG. 3A.
FIG. 3C shows the computed relevancy score of an example scenario.

In order to filter irrelevant results, the methodology of the present disclosure in one embodiment uses attributes other than the classification keywords to infer broad context. In the IT incident management domain, an account is a well-accepted concept representing an organization unit responsible for the resolution of incidents in a particular business area. In general, each account involves general-purpose support workgroups, such as Network support team, and specialized support team, e.g., Internet Service support team. The technology configuration of an account thus can be inferred from the specialized workgroups. In one aspect, a diagram may be plotted among accounts and specialized workgroups, where each node is either a workgroup or an account and the link between an account and a workgroup indicates the workgroup is called for the account's incidents. An example is shown in FIG. 3A. This diagram illustrates the technology configuration and similarity among accounts by technology configurations. Accounts (302, 304, 306) may represent business groups of an organization; Workgroups (308, 310, 312, 314, 316, 318, 320, 322, 324) may represent technology groups of the organization. For example, account A1 (302) engages workgroup G1-5 (308-316), while A2 (304) involves workgroups G3-5 (312-316) and G7 (320). Using the same vector-space model, the similarity between A1 (302) and A2 (304) is estimated to be 67% as shown in FIG. 3B. The methodology of the present disclosure in one embodiment uses this similarity to estimate context relevancy ($w_3$) because shared workgroups indicate technology dependencies and compatibility between each other. For each incident returned from a search, the final relevancy score $r=f(s, w_3)$. For instance, a simple function that may be used is $r=\alpha*w_3+(1-\alpha)*s$, where $0<\alpha<1$. Given that three incidents in Table 5 belong to account A1, A2, and A3 respectively, with $\alpha=0.5$, the final relevancy score may be obtained for $v_2$ and $v_3$ as 0.72 and 0.48 respectively.

Referring to the example shown in Table 5, in terms of similarity, both v2 and v3 are close. Which one is more relevant? The similarity or relevancy between accounts (organization responsible for incidents) may provide more information. For instance, account technology configuration may be inferred from specialized workgroups involved. FIG. 3A shows this inference. Then, account similarity score (or relevancy score) $w_3$, between accounts is calculated. FIG. 3B shows the calculated similarity scores. Then, final relevancy score may be calculated, e.g., as follows:

$$r=f(s,w_3) \quad\quad\text{a.}$$

$$\text{e.g., } r=0.5*w_3+(1-0.5)*s \quad\quad\text{b.}$$

FIG. 3C shows the computed final relevancy score. From the calculations, it can be concluded that v2 is more relevant to v1 than v3.

Broadly, searching for co-occurring and reoccurring incidents may comprise finding incidents matching the keywords and other keywords with one or more dependency relationships specified in the association rules and calculating relevancy score of each of the found incidents based on accuracy of matched keywords, dependency, and context relevancy.

In one aspect, for each of the relevant incidents found in the search, relevancy weight (w3) may be assigned to each found incident. For example, each incident has a responsible account. Each account has technology portfolio. Two accounts may be similar regarding technology portfolio. The account relevancy or similarity may be used as relevancy weight. Then, relevancy/similarity score may be calculated by using w1, w2, w3, for example, the cosine of the angle between the keyword vectors representing two IT incidents (e.g., tickets from different accounts, e.g., SAP and DB2). Then, relevant incidents may be determined by relevancy score. For example, to determine co-occurring incidents, incidents with high relevancy score greater than a threshold and those that happened around the same time may be identified as co-occurring. To determine reoccurring incidents in one embodiment, incidents with high relevancy score greater than a threshold may be identified. In another embodiment, reoccurring incidents may be determined as follows: Calculate relevancy score (i.e., vector space distance) of each pair within the selected incident and relevant incidents, cluster by relevancy score, and find the cluster to which the selected incident belongs.

Referring to FIG. 1, at 106, a group of incidents is correlated with causes, e.g., changes (updates to system components), traffic (e.g., percentage of system component usage such as 90% CPU usage), maintenance (e.g., a server shutdown for regular maintenance) or other incidents. This step identifies suspected causes, e.g., detects root cause using relevant incidents. The processing in this step may comprise summarizing commonalities among relevant incidents. For example, group of incidents happened on the same sever, then the commonality may be server hardware problem; group of incidents depend on the same infrastructure components, then the commonality may be infrastructure issue; if common resolution strategy is identified then the commonality may be common keywords recorded in reoccurring incident diagnosis. The processing in this step may further comprise constructing causal event chain by tracing co-occurring incidents based on IT component architecture and relationships. For example, incidents in upstream applications affect downstream components. The processing in this step may further comprise finding other incidents and events correlated with the group of relevant incidents, for example, server rebooting events preceding a group of reoccurring incidents; high central processing unit (CPU) usage alerts preceding a group of reoccurring incidents; changes deployed before a group of reoccurring incidents.

Broadly, the correlating group of incidents with causes comprises finding common events comprising one or more of changes, traffic anomaly patterns, and other events preceding the group of incidents, and statistically determining correlation relationship between the common events and the incidents.

Continuous analysis on a group of relevant incidents often provides insights for SMEs to diagnose root causes and define proactive actions to prevent similar incidents. First, the methodology of the present disclosure may summarize commonalities of relevant incidents. These commonalities allow SMEs to pinpoint exact problems and exclude other suspected causes. For example, incident IN1 and its reoccurring incidents share common keywords: "ServerXYZ" and "mqseries", suggesting SMEs to focus on MQSeries installed on Server XYZ server. As another example, if a group of re-occurring incidents all depend on an infrastructure component, this component is a highly suspected cause. Also, extracting common keywords from the resolution description of a group of reoccurring incidents can provide useful insights into resolution strategies. Second, a group of co-occurrence times may disclose potential application dependencies. More advanced analysis can be conducted to correlate a group of relevant incidents with other data, for example, maintenance schedule, resource usage, and change events (e.g., application fix, upgrade). With the correlation, prediction rules can be configured to predict potential problems. For example, incident IN1 has been diagnosed in this way to find its root cause. A finding is that IN1 and its reoccurring incidents are highly correlated with messages alerting lost MQSeries connections after a server rebooted for regular maintenance. With this discovery, a rule is configured to alert SMEs when a server maintenance event is scheduled. At 108, association rules are defined between incident commonalities and causes, and potential problems are predicted. This step identifies diagnosis. Generating diagnosis may include creating a report showing the co-occurring and reoccurring incidents, the causes, the defined association rules between the commonalities of the incident group and the causes. User feedback may be collected on the report and iteratively improving the diagnosis.

Previous incident diagnosis often focused on system or infrastructure layer. The methodology of the present disclosure focuses on application layer, which aggregates problems from all layers below, involving complicated dependencies. The methodology of the present disclosure in one embodiment employs a number of techniques to improve the accuracy of problem diagnosis. For instance, instead of ad-hoc diagnosis, the methodology of the preset disclosure may provide a systematic, automated diagnosis with optional subject matter expert (SME) interactions.

Figure 4:
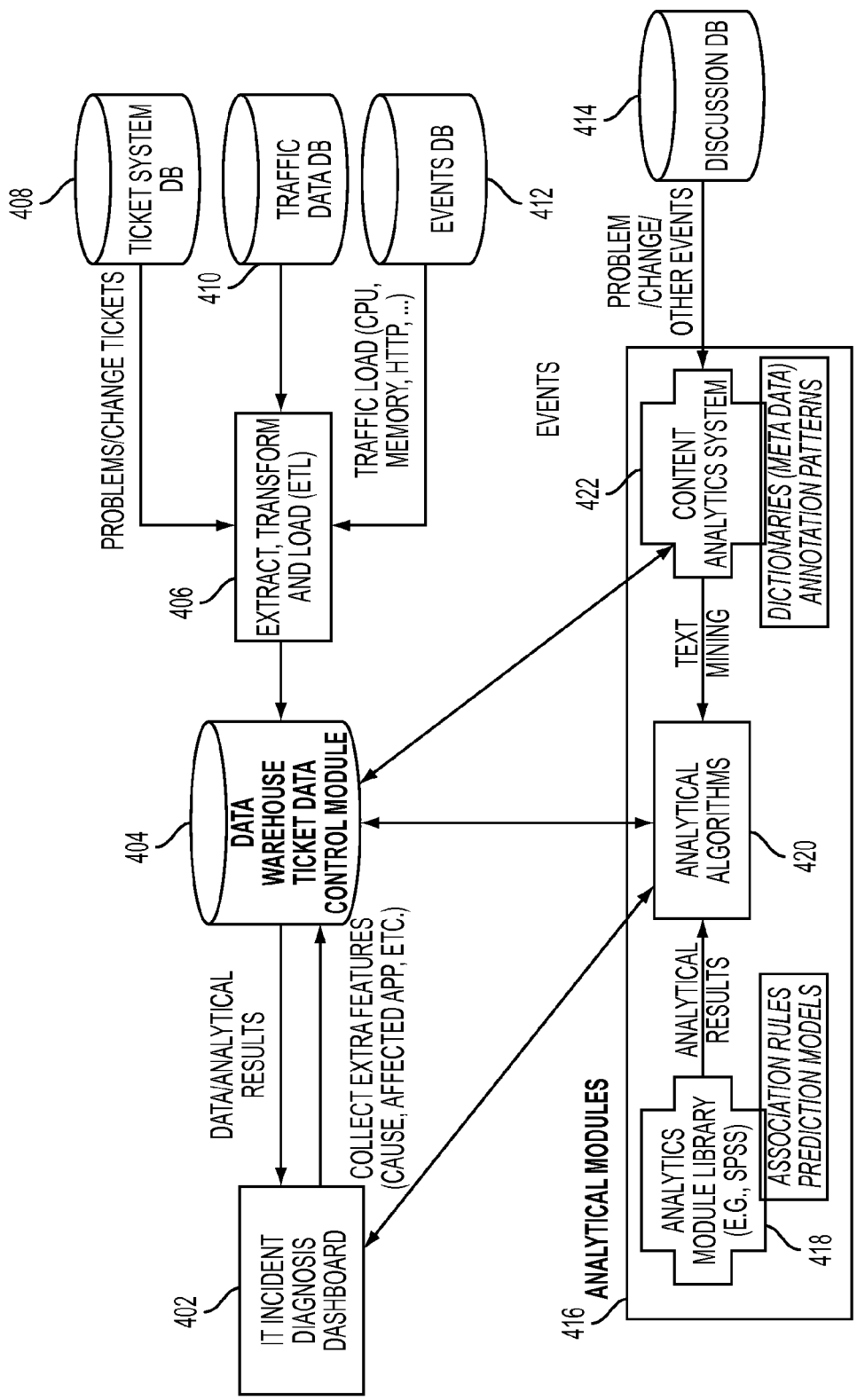
FIG. 4 is a block diagram illustrating a system for diagnosing IT incidents in one embodiment of the present disclosure.

FIG. 4 is a block diagram illustrating a system for diagnosing IT incidents in one embodiment of the present disclosure. User interface such as dashboard 402 or the like may be provided for user interactions. Data such as problem tickets from a ticket system database 408 or the like, traffic data (e.g., CPU usage in real-time) from a traffic data database 410 or the like, event data (e.g., monitored by monitoring agents) from events database 412 or the like, may be extracted at 406 and stored in a data warehouse 404 or the like. Analytical algorithms 420 may perform the processing, e.g., described with reference to FIG. 1 above, utilizing a learning tool 418 or the like such as an analytics module library (e.g., SPSS), and a text mining tool 422 or the like such as a content analytics system that mines metadata and annotation patterns. Discussion database 414 may provide text data comprising record discussion to the text mining tool 422.

Figure 8:
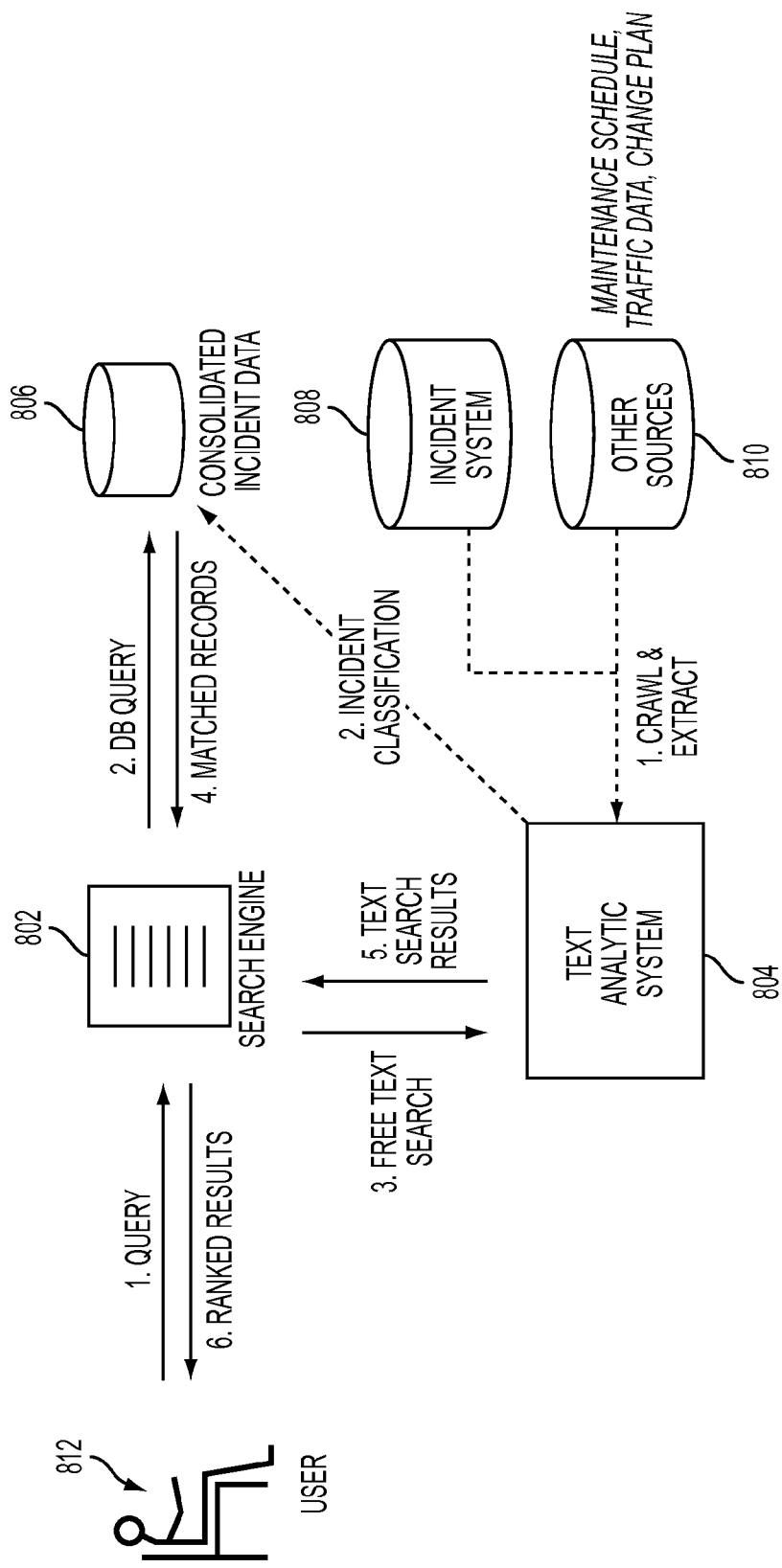
FIG. 8 shows an implemented architecture of a search engine of the present disclosure in one embodiment.

FIG. 8 shows an implemented architecture of a search engine 802 of the present disclosure in one embodiment. This engine has two types of flows: front-end (solid line) and backend (dotted line). At the backend, incidents data (e.g., from an incident system 808 and other sources 810 that may store maintenance schedule, traffic data, change plan, etc.) are extracted and fed into the IBM Context Analytics (ICA) 804 or the like. Classification keywords are extracted, validated, and stored in a database 806 as consolidated incident data. At the front-end, a user 812 issues a query to the search engine 802 and the search engine 802 transforms this query into two sub-queries, one for structured search to the database and the other to ICA for free text search. Search results are consolidated and ranked. In one aspect, since a large portion of the query is handled as a database query, the search is efficient. A pilot test shows on average it takes less than a minute to complete a search for co-occurring/reoccurring incidents from about 140,000 incident records.

This new search engine is evaluated by SMEs in a pilot test. SMEs carefully chose 23 incidents as testing cases. A new evaluation metric combining both recall and precision rates were designed. For each testing case, at maximum 20 relevant incidents are returned. SMEs rated each testing case: success, partial success, failure, or unknown. A testing case was rated success only if all SME-recognized relevant incidents (usually less than 20) were returned. A result was rated as "unknown" if it cannot be confirmed.

The present disclosure presented investigation and diagnosis of incidents in ITSM using text mining and statistical methods. The approach in one aspect of the present disclosure improves the search accuracy by considering domain knowledge and incident context during search. The approach of the present disclosure in one aspect adapts Vector Space Model to calculate relevancy score between incidents. Another technique used in the present disclosure is co-occurrence networks, which represent the collective interconnection of terms based on their paired presence within a specified unit of text (See, e.g., Berry, M. W. and Castellanos, M. Survey of Text Mining I: Clustering, Classification, and Retrieval, 2nd Edition, Springer, 2007). In the present disclosure, a methodology in one embodiment applies this concept to automatically learn keyword dependency as domain knowledge.

To put another way, an approach is disclosed to diagnosing application incidents by effectively searching for relevant co-occurring and reoccurring incidents. A hybrid search engine may be designed that finds relevant incidents in both structured and unstructured formats. These relevant incidents together reveal underlying patterns of incidents and then provide SMEs insights into incident causes and resolution. In another aspect, predictive modeling capability based on relevant incidents discovered may be developed. Its root cause analysis capability may be enhanced with a richer set of test data and test cases.

Figure 5:
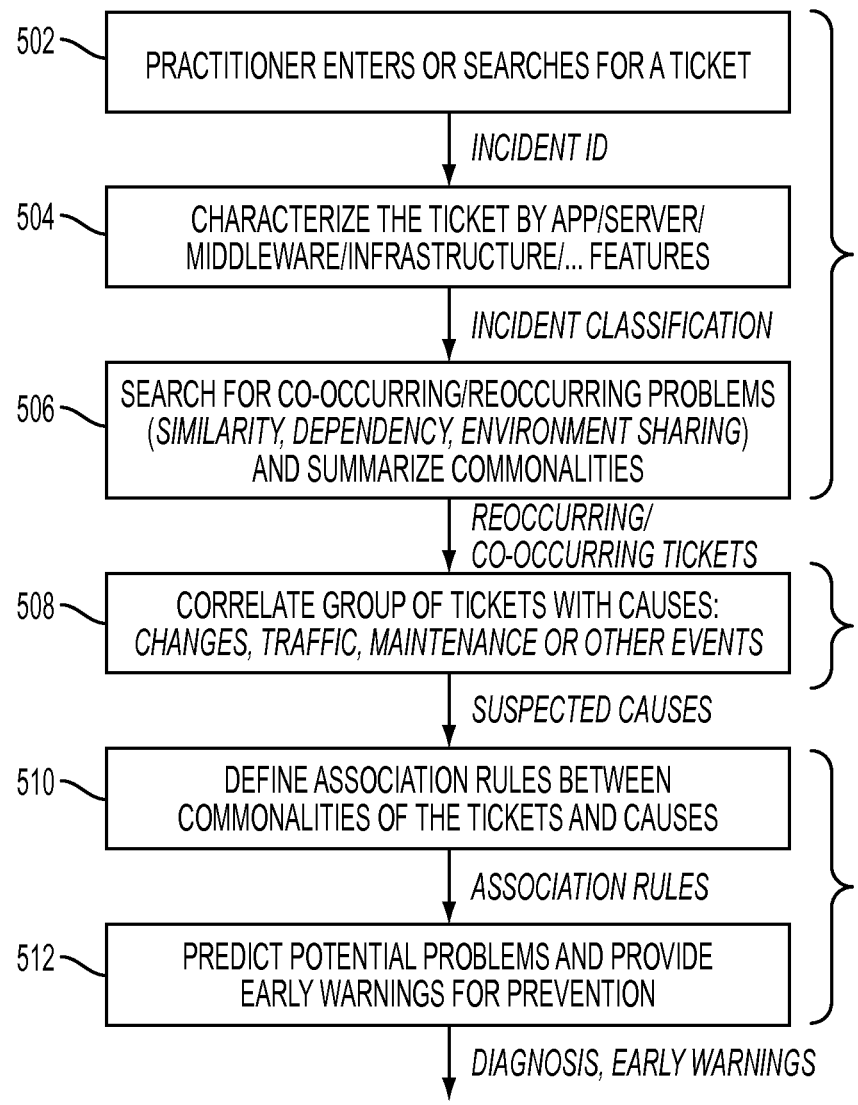
FIG. 5 is a flow diagram illustrating a use case of a method for diagnosing IT incidents in one embodiment of the present disclosure.

FIG. 5 is a flow diagram illustrating a use case of a method for diagnosing IT incidents in one embodiment of the present disclosure. At 502, practitioner enters or searches for a ticket. Problem tickets may be real-time tickets or off-line tickets. At 504, the ticket is characterized by features such as application, server, middleware, infrastructure of another classification. Such features may be obtained from meta data of the ticket. At 506, co-occurring/reoccurring problems (similarity, dependency, environment sharing) are searched for and commonalities are summarized. The processing at 502, 504 and 506 perform ticket analysis by relevancy and similarity. The processing at 502, 504 and 506 provides SME or the like information on co-occurring or reoccurring tickets so that the SME or the like can understand causes of problems and refer to reoccurring cases to accelerate resolution. A scenario may include an SME who selects a particular ticket, views co-occurring/reoccurring tickets, finds suspected causes by looking at commonalities of the tickets, and records analysis results. An optional triggering event may include a new ticket that is received or an SME who selects a particular ticket for analysis. Other actors may include consultant, application focal point. Input data may include problem ticket data with meta data (e.g., application name, hosting server, middleware, infrastructure, dependencies, or other common keywords). Output data may include dynamically generated co-occurring/reoccurring ticket reports with suspected causes. An example flow of events may include: User enters or selects a ticket and the system classifies the ticket; User views co-occurring tickets to understand what has happened along with the select tickets; User views similar tickets in the history and common features (e.g., RCA, resolution) of these tickets; User confirms or edits ticket classification and records cause analysis results of the selected ticket.

At 508, group of tickets are correlated with causes: e.g., changes, traffic, maintenance or other events. Data sources for this processing may include problem tickets, traffic load, change tickets, event logs that are available real-time or off-line. This processing performs root cause analysis for co-occurring/reoccurring tickets. It provides suspected causes of co-occurring/reoccurring tickets originating from sources such as: traffic load, changes deployed, and maintenance or other events. A scenario may include an SME that finds a list of co-occurring/reoccurring tickets, views suspected causes of these tickets, and confirms root causes. An optional triggering event may include an SME who selects a group of co-occurring/reoccurring tickets. Other actors may include consultants, application focal point, or others. Input data to this processing may include ticket data, traffic load, change tickets, maintenance (or monitoring event) logs. Output data in this processing may include suggested root causes. An example flow of events may include: User selects a group of co-occurring/reoccurring tickets; User views suspected causes and checks the explanation of each suspected causes; User confirms causes of the co-occurring/reoccurring tickets.

At 510, association rules are defined between commonalities of the tickets and causes. At 512, based on the association rules, potential problems may be predicted and early warnings may be provided for prevention. Data sources for the processing at 510 and 512 may include traffic load, change tickets, maintenance event schedule that are available real-time. The processing at 510 and 512 performs application failure prediction and prevention, e.g., implements rules predicting potential application failures and providing early warnings. A scenario may include an SME who confirms prediction rules suggested based on root cause analysis, the system that enables the rules, and the system that provides a list of consolidated early warnings to SMEs to prevent potential failures. Other actors may include consultants, application focal point, and others. Input data to the processing may include ticket data, real-time traffic load, real-time change tickets, real-time maintenance schedule. Output data may include early warnings for potential application failures. An example flow of events may include: User views prediction rules suggested from root cause analysis and confirms some rules; When the system detects events satisfying the condition of the rules, the system generates and consolidates alerts; User views alerts and take actions.

Figure 6:
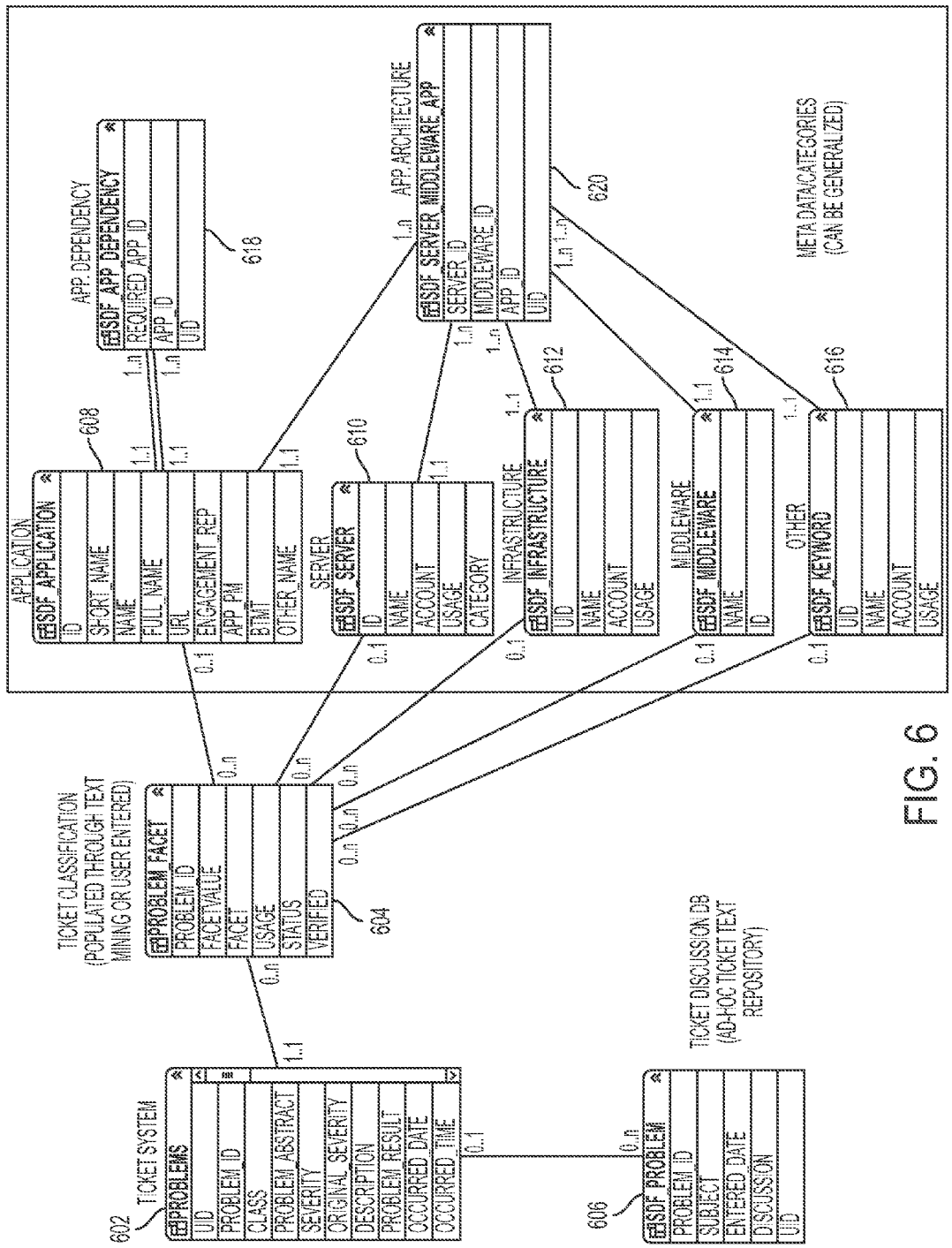
FIG. 6 is an example of a data structure or data model for a ticket in one embodiment of the present disclosure.

FIG. 6 is an example of a data structure or data model for a ticket in one embodiment of the present disclosure. Data model can be extended to accommodate: new application environment; new data sources; new analysis dimensions (categories). The data model is an example of a problem ticket data model. Similar model may be implemented or used for changes tickets. Incidents from incident logging system 602 may be linked to a ticket classification object 604, e.g., populated through text mining or user entered. TSRM ticket 602 may be also linked to a ticket discussion DB object 606. Ticket classification object 604 specifies classification features, e.g., via link to an application object 608, a server object 610, an infrastructure object 612, a middleware object 614, and/or other classification object 616. An application object 608 may link to an application dependency object 618 and an application architecture object 620. A server object 610, an infrastructure object 612, a middleware object 614, and/or other classification object 616 may link to an application architecture object 620.

Figure 7:
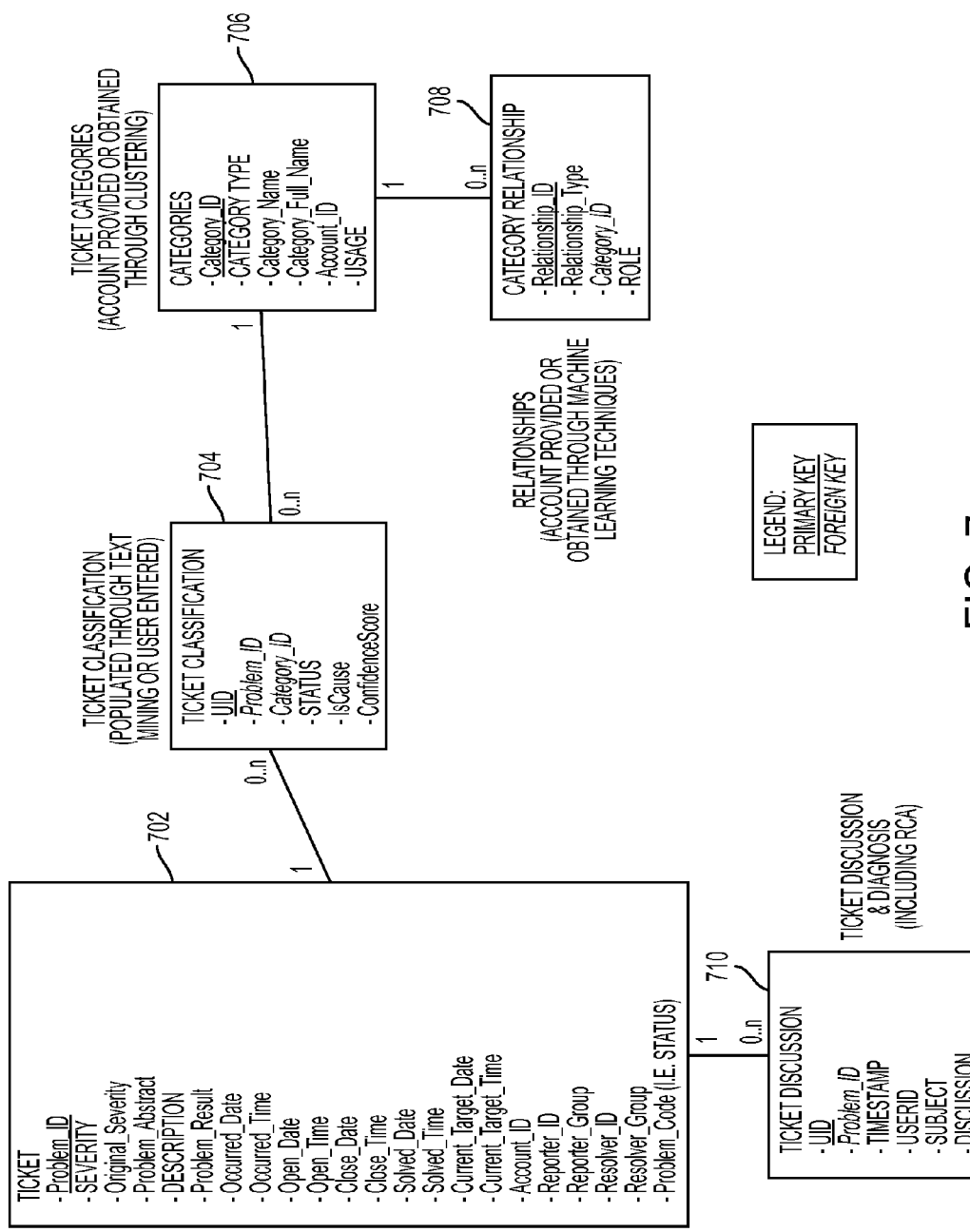
FIG. 7 is an example of a generalized ticket data model in one embodiment of the present disclosure.

FIG. 7 is an example of a generalized ticket data model in one embodiment of the present disclosure. A ticket object 702 describes tickets using the shown attributes (e.g., problem_id, severity, original_severity, problem_abstract, description, problem_result, occurred_date, occurred_time, open_date, open_time, close_date, close_time, solved_date, solved_time, current_target_date, current_target_time, account_id, reporter_id, reporter_group, resolver_id, resolver_group, problem_code (i.e., status)). Ticket classification object 704 describes ticket classification with the shown attributes (e.g., uid, problem_id, category_id, status, iscause, confidencescore). This object may be populated though text mining or a user may enter the information. Ticket categories object 706 describes ticket categories using the shown attributes (e.g., category_id, category type, category_name, category_full_name, account_id, usage). Categories may be provided or obtained through clustering. Category relationship object 708 describes category relationship using the information in the attributes shown (e.g., relationship id, relationship type, category id, role). Ticket discussion object 710 describes ticket discussion and diagnosis using the information in the attributes shown (e.g., uid, problem_id, timestamp, userid, subject, discussion).

FIGS. 9A-9D illustrate a sample generalized ticket data model that is populated with example data. FIG. 9A shows sample ticket object and attribute data. FIG. 9B shows sample ticket classification object and attribute data. FIG. 9C shows sample ticket category relationship object and attribute data. FIG. 9D shows sample ticket categories object and attribute data.

Incident classification of the present disclosure, in one aspect, may continuously learn keyword relationships through historical data, represents relationships as belief network, and validate keywords by belief network. Searching for relevant incidents of the present disclosure, in one aspect, may search across servers and/or accounts. Relevancy score may be calculated by matched keywords, keyword accuracy, dependency, and incident context. Detecting causes in the present disclosure, in one aspect, may systematically find correlation between anomaly patterns and a group of relevant incidents. Generating diagnosis in the present disclosure, in one aspect, may interactively take user feedback, update domain knowledge, and perform real-time cause detection.

The following description illustrates an example case study. A large corporation in the IT industry has over a thousand applications to support its business ranging from large-scale packaged applications (e.g. SAP) to small proprietary systems, which run in a shared, dynamic IT infrastructure. A critical objective is to maintain high-level application availability and reduce outages. It is challenging to diagnose incidents at the application level, because those incidents are often aggregated effects from problems in other lower layers. For example, the enterprise had a recent incident that blocked online orders for software. Meanwhile, another application supporting software downloading also failed. An exhaustive investigation led to a highly suspected cause that a dependent application for authenticating customers failed because of a storage area network outage happened in another geographic area.

Although this company has an integrated system for reporting and managing all IT incidents, relevant incidents could not be easily discovered for a few reasons. First, IT components are often managed by workgroups organized by expertise and by geography in a matrix structure. Due to this separation, relevant incidents may not be well communicated across workgroups. Second, the entire IT platform involves extreme complicated dependencies among IT components. Without deep knowledge about such dependencies, it would be impossible to scope relevant ones out of a huge number of incidents. Moreover, such dependencies are under constant evolution as the platform changes (e.g., provisioning new servers). Finally, useful information about an incident, such as affected IT components, symptoms, diagnosis results, is often recorded as free-form text. A typical incident is shown in Table 1. Another phenomenon is the frequent use of ambiguous acronyms. For example, depending on the context, "HRS" may mean "Hostname Resolution System" (an application name) or "Hours". Searching incidents only by keywords without considering their context is often deficient.

As illustrated by the case study, an incident is often not an isolated event. It can be diagnosed by finding relevant co-occurring and reoccurring incidents and consolidating them to discover insights regarding how it happened and how it can be fixed. A search algorithm of the present disclosure in one embodiment may comprise the following steps: classifying incidents, searching incident by keywords, and calculating relevancy score and ranking search results.

The approach of the present disclosure may be developed based on a generic incident data structure, and can be applied in incident management scenarios, for example, IT help desk support.

Figure 10:
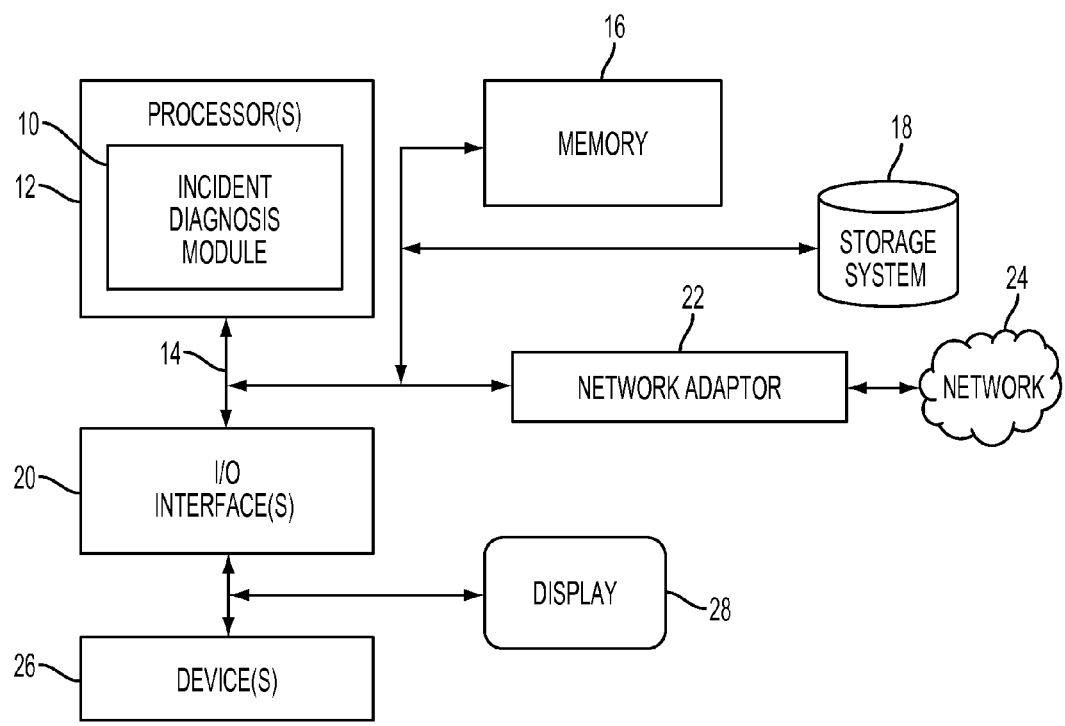
FIG. 10 illustrates a schematic of an example computer or processing system that may implement an incident diagnosing system in one embodiment of the present disclosure.

FIG. 10 illustrates a schematic of an example computer or processing system that may implement the system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include an incident diagnosis module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system"

and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for diagnosing and detecting causes of an incident interactively, comprising:
    classifying the incident by keywords by searching a problem ticket describing the incident for the keywords, the keywords comprising at least server name, application name, middleware and symptoms, wherein the incident is classified automatically by a processor according to the keywords occurring in the problem ticket based on the server name, the application name, the middleware and the symptoms in common with other tickets,
    the keywords assigned accuracy weights respectively based on a validity of the respective keyword and boosting weights respectively based on impact of the respective keyword;
    adding dependency keywords to the keywords, the dependency keywords representing dependent components among IT components involved in the problem ticket, wherein the dependency keywords are respectively given a boosting weight, wherein the respective default boosting weight is assigned to each keyword based on the impact of the keyword;
    searching for co-occurring and reoccurring group of incidents based on the keywords,
    the co-occurring and reoccurring group of incidents determined based on a similarity score determined as a function of the accuracy weights and the boosting weights associated with said keywords identified in the problem ticket and one or more of said keywords identified in an incident in the co-occurring and reoccurring group of incidents,
    the co-occurring group of incidents comprising incident tickets that occurred concurrently at different information technology (IT) components and the reoccurring group of incidents comprising incident tickets that repeat over time;
    summarizing commonalities in the group of incidents;
    correlating the group of incidents with causes;
    defining association rules between the commonalities; and
    predicting potential problems based on the correlated group of incidents with causes.

2. The method of claim 1, wherein the searching for co-occurring and reoccurring group of incidents further comprises searching for similarity among the incidents in the group, the similarity determined by computing a similarity score based on weighted vector of keywords occurring in the incidents.

3. The method of claim 1, wherein the searching for co-occurring and reoccurring group of incidents further comprises searching for dependency among the incidents in the group.

4. The method of claim 1, wherein the searching for co-occurring and reoccurring group of incidents further comprises searching for shared environment among the incidents in the group.

5. The method of claim 1, wherein the causes comprise changes to an information technology system, traffic of the information technology system, maintenance of the information technology system.

6. The method of claim 1, wherein the classifying comprises:
    extracting keywords from consolidated incident data;
    validating the keywords using provided and automatically learned domain knowledge built from historical incident data, wherein the automatically learned domain knowledge comprises at least said defined association rules; and
    assigning accuracy weight for each of the keywords based on confidence level associated with each of the association rules.

7. The method of claim 1, wherein the searching comprises:
    finding incidents matching the keywords and other keywords with one or more dependency relationships specified in the association rules; and
    calculating a score of each of the found incidents based on accuracy of matched keywords, dependency, and context.

8. The method of claim 1, wherein the correlating comprises:
    finding common events comprising one or more of changes, traffic anomaly patterns, and other events preceding the group of incidents;
    statistically determining a correlation relationship between the common events and the incidents.

9. The method of claim 1, further comprising:
    generating diagnosis comprising creating a report showing the co-occurring and reoccurring incidents, the causes, the defined association rules between the commonalities of the incident group and the causes.

10. The method of claim 9, further comprising:
    collecting user feedback on the report and iteratively improving the diagnosis.

11. A non-transitory computer readable storage medium storing a program of instructions executable by a machine to perform a method of diagnosing and detecting causes of an incident interactively, comprising:
    classifying the Incident by keywords by searching a problem ticket describing the incident for the keywords, the keywords comprising at least server name, application name, middleware and symptoms, wherein the incident is classified automatically by a processor according to the keywords occurring in the problem ticket based on the server name, the application name, the middleware and the symptoms in common with other tickets,
    the keywords assigned accuracy weights respectively based on a validity of the respective keyword and boosting weights respectively based on impact of the respective keyword;
    adding dependency keywords to the keywords, the dependency keywords representing dependent components among IT components involved in the problem ticket, wherein the dependency keywords are respectively given a boosting weight, wherein the respective default boosting weight is assigned to each keyword based on the impact of the keyword;

searching for co-occurring and reoccurring group of incidents based on the keywords, the co-occurring and reoccurring group of incidents determined based on a similarity score determined as a function of the accuracy weights and the boosting weights associated with said keywords identified in the problem ticket and one or more of said keywords identified in an incident in the co-occurring and reoccurring group of incidents, the co-occurring group of incidents comprising incident tickets that occurred concurrently at different information technology (IT) components and the reoccurring group of incidents comprising incident tickets that repeat over time;

summarizing commonalities in the group of incidents;

correlating the group of incidents with causes;

defining association rules between the commonalities; and predicting potential problems based on the correlated group of incidents with causes.

12. The computer readable storage medium of claim 11, wherein the searching for co-occurring and reoccurring group of incidents further comprises searching for similarity among the incidents in the group, the similarity determined by computing a similarity score based on weighted vector of keywords occurring in the incidents.

13. The computer readable storage medium of claim 11, wherein the searching for co-occurring and reoccurring group of incidents further comprises searching for dependency among the incidents in the group.

14. The computer readable storage medium of claim 11, wherein the searching for co-occurring and reoccurring group of incidents further comprises searching for shared environment among the incidents in the group.

15. The computer readable storage medium of claim 11, wherein the causes comprise changes to an information technology system, traffic of the information technology system, maintenance of the information technology system.

16. The computer readable storage medium of claim 11, wherein the classifying comprises:

extracting keywords from consolidated incident data;

validating the keywords using provided and automatically learned domain knowledge built from historical incident data, wherein the automatically learned domain knowledge comprises at least said defined association rules; and assigning accuracy weight for each of the keywords based on confidence level associated with each of the association rules.

17. The computer readable storage medium of claim 11, wherein the searching comprises:

finding incidents matching the keywords and other keywords with one or more dependency relationships specified in the association rules; and calculating a score of each of the found incidents based on accuracy of matched keywords, dependency, and context.

18. The computer readable storage medium of claim 11, wherein the correlating comprises:

finding common events comprising one or more of changes, traffic anomaly patterns, and other events preceding the group of incidents;

statistically determining correlation relationship between the common events and the incidents.

19. The computer readable storage medium of claim 11, further comprising:

generating diagnosis comprising creating a report showing the co-occurring and reoccurring incidents, the causes, the defined association rules between the commonalities of the incident group and the causes.

20. The computer readable storage medium of claim 19, further comprising:

collecting user feedback on the report and iteratively improving the diagnosis.

21. A system for diagnosing and detecting causes of an incident interactively, comprising:

a processor;

a user interface operable to execute on the processor and issue a query;

a search engine operable to execute on the processor, and further operable to receive the query, transform the query into sub-queries comprising a structured search and a free-text search, to search for co-occurring and reoccurring group of incidents, the search engine further operable to correlate the group of incidents with causes based on common events found in the group of incidents, and present the co-occurring and reoccurring group of incidents and the causes to the user interface, the co-occurring group of incidents comprising incident tickets that occurred concurrently at different information technology (IT) components and the reoccurring group of incidents comprising incident tickets that repeat over time, wherein the query is bunt based on searching a problem ticket describing one of the incidents for the keywords, the keywords comprising at least server name, application name, middleware and symptoms, wherein the incident is classified automatically by a processor according to the keywords occurring in the problem ticket based on the server name, the application name, the middleware and the symptoms in common with other tickets, the keywords assigned accuracy weights respectively based on a validity of the respective keyword and boosting weights respectively based on impact of the respective keyword, wherein dependency keywords are added to the keywords, the dependency keywords representing dependent components among IT components involved in the problem ticket, wherein the dependency keywords are respectively given a boosting weight, wherein the respective default boosting weight is assigned to each keyword based on the impact of the keyword, wherein the co-occurring and reoccurring group of incidents are searched for in the incidents, the co-occurring and reoccurring group of incidents determined based on a similarity score determined as a function of the accuracy weights and the boosting weights associated with said keywords identified in the problem ticket and one or more of said keywords identified in other one or more of the incidents.

22. The system of claim 21, further comprising:

a text mining module operable to receive incident data and information associated with maintenance schedule, traffic data, and change plan of an information technology system, classify the incident data by keywords, and store the classified data as consolidated incident data.

23. The system of claim 22, further comprising:

a learning module operable to summarize commonalities in the group of incidents and define association rules between the commonalities.

24. The system of claim 23, wherein the learning module is further operable to predict potential problems based on the correlated group of incidents with causes.

25. A method of for diagnosing and detecting causes of an incident interactively, comprising:
- searching for incident tickets by keywords wherein association between the keywords are automatically learned through association rule mining;
- computing, by a processor, similarity scores to generate a rank list of results of the search;
- determining, by the processor, context weight by examining account technology portfolio to eliminate one or more of the incident tickets from the ranked list of results; and
- returning a top predetermined number of results from the ranked list of results,
- wherein the keywords are defined based on searching a problem ticket describing the incident for predefined keywords, the predefined keywords comprising at least server name, application name, middleware and symptoms, wherein the incident is classified automatically by a processor according to the keywords occurring in the problem ticket into a classification based on the server name, the application name, the middleware and the symptoms,
- the keywords assigned accuracy weights respectively based on a validity of the respective keyword and boosting weights respectively based on impact of the respective keyword;
- adding dependency keywords to the keywords, the dependency keywords representing dependent components among IT components involved in the problem ticket, wherein the dependency keywords are respectively given a boosting weight, wherein the respective default boosting weight is assigned to each keyword based on the impact of the keyword,
- the searching further comprising searching for co-occurring and reoccurring group of incidents, the co-occurring and reoccurring group of incidents determined based on a similarity score determined as a function of the accuracy weights and the boosting weights associated with said keywords identified in the problem ticket and one or more of said keywords identified in an incident in the co-occurring and reoccurring group of incidents, the co-occurring group of incidents comprising incident tickets that occurred concurrently at different information technology (IT) components and the reoccurring group of incidents comprising incident tickets that repeat over time.

26. The method of claim 25, wherein the returning a top predetermined number of results further comprises determining a similarity threshold to select the top predetermined number of results from the ranked list of results.

27. The method of claim 25, wherein the returning a top predetermined number of results further comprises employing a clustering technique to select the top predetermined number of results from the ranked list of results.

* * * * *